(12) United States Patent
Moderegger et al.

(10) Patent No.: US 8,352,324 B2
(45) Date of Patent: Jan. 8, 2013

(54) METHOD AND SYSTEM FOR MANAGING INVITATIONS TO BID

(75) Inventors: Wolfgang Moderegger, Schönau am Königssee (DE); Christian Steinlehner, Munich (DE)

(73) Assignee: AIS Management GmbH, Munich (DE)

( * ) Notice: Subject to any disclaimer, the term of this patent is extended or adjusted under 35 U.S.C. 154(b) by 3 days.

(21) Appl. No.: 12/986,200

(22) Filed: Jan. 7, 2011

(65) Prior Publication Data

US 2011/0161192 A1 Jun. 30, 2011

Related U.S. Application Data

(62) Division of application No. 09/944,379, filed on Sep. 4, 2001, now Pat. No. 7,870,030.

(30) Foreign Application Priority Data

Oct. 20, 2000 (DE) .................................. 100 52 214

(51) Int. Cl.
*G06Q 30/00* (2012.01)
*G06F 17/60* (2006.01)

(52) U.S. Cl. ........................................... 705/26; 705/37

(58) Field of Classification Search ...................... 705/26
See application file for complete search history.

(56) References Cited

U.S. PATENT DOCUMENTS

| | | | |
|---|---|---|---|
| 5,758,328 A | 5/1998 | Giovannoli | |
| 5,794,207 A | 8/1998 | Walker et al. | |
| 5,960,411 A | 9/1999 | Hartman et al. | |
| 5,966,699 A | 10/1999 | Zandi | |
| 6,236,409 B1 | 5/2001 | Hartman | |
| 6,356,909 B1 | 3/2002 | Spencer | |
| 6,526,423 B2 | 2/2003 | Zawadzki et al. | |
| 6,581,040 B1 | 6/2003 | Wright et al. | |
| 6,669,832 B1 | 12/2003 | Saito et al. | |
| 7,861,278 B1* | 12/2010 | Harvey et al. ................. | 725/136 |

(Continued)

FOREIGN PATENT DOCUMENTS

WO WO 0052605 9/2000

OTHER PUBLICATIONS

"Target Price System for Competitive Bid Goods and Services" Boyd et al: Mar. 3, 2000.*

*Primary Examiner* — Garcia Ade
(74) *Attorney, Agent, or Firm* — Buchanan Ingersoll & Rooney PC

(57) ABSTRACT

A system and method for managing the drafting, submission, and evaluation of invitations to bid for the delivery of one or more products and/or services. An archival database of performance descriptions and prices is utilized to generate a list of desired performances; the list being automatically distributed to a plurality of selected potential bidders. Upon receipt of the submitted bids, the system evaluates the bids based on price, past pricings, and bidder performance history. A bid is selected as the winning bid, and a contract listing the desired performances is generated and forwarded to the successful bidder. During contract performance, bidder performance is monitored, with the results being added to a historical database for subsequent use in the bid evaluation and selection process. The contents of the successful bid, including any new performance descriptions drafted during the generation of the bid, are added to the archival database for use in future bid invitation generation applications.

5 Claims, 11 Drawing Sheets

U.S. PATENT DOCUMENTS

| | | |
|---|---|---|
| 2001/0039529 A1 | 11/2001 | Hoffman |
| 2001/0051913 A1 | 12/2001 | Vashistha et al. |
| 2002/0010651 A1 | 1/2002 | Cohn et al. |
| 2002/0016725 A1 | 2/2002 | Eichstaedt et al. |
| 2002/0026398 A1 | 2/2002 | Sheth |
| 2002/0069154 A1* | 6/2002 | Fields .............................. 705/37 |
| 2002/0077954 A1 | 6/2002 | Slaight et al. |
| 2002/0198818 A1 | 12/2002 | Scott et al. |
| 2003/0208434 A1 | 11/2003 | Posner |

* cited by examiner

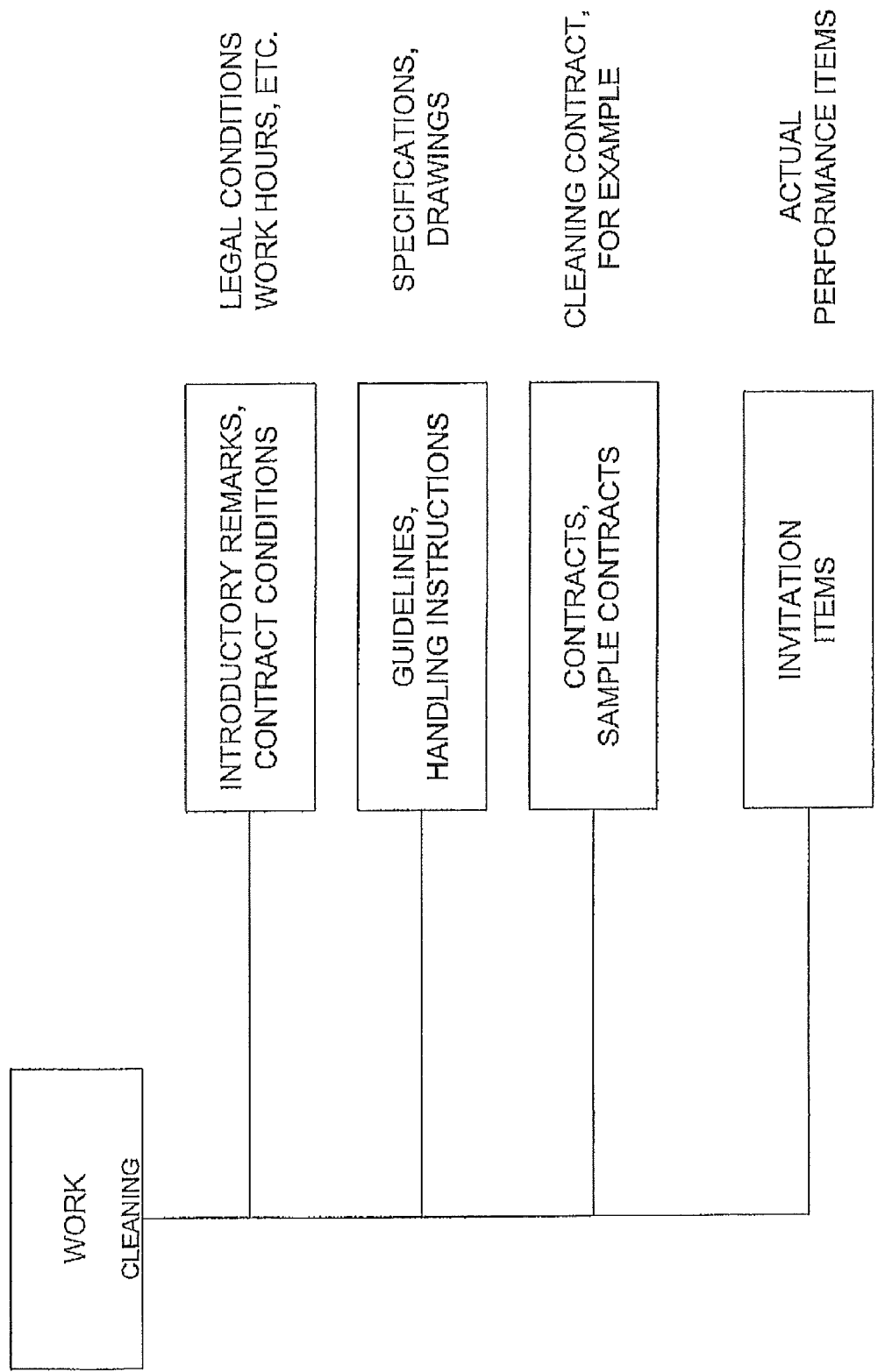

|   | 1 | 2 | 3 | 4 |
|---|---|---|---|---|
|   |   | Bids | Unit | Amount |
| Work → |   | LV Moving Services |   |   |
|   |   |   |   |   |
| Title → |   | 01 Furniture Removal |   |   |
|   | 0001 | Transport of Office Furniture Within the Site | sq m | 80000 |
|   | 0002 | Load+Unload+Transport of O.F. Within Location | sq m | 60000 |
|   | 0003 | Load+Unload+Transport of O.F. up to 50 km | sq m | 15000 |
|   | 0004 | Load+Unload+Transport of O.F. from 50 km to 250 km | sq m | 10000 |
|   | 0005 | Transport of Laboratory Furniture Within the Building | sq m | 5000 |
|   | 0006 | Load+Unload+Transport of L.F. Within Location | sq m | 5000 |
|   | 0007 | Load+Unload+Transport of L.F. up to 50 km | sq m | 5000 |
|   | 0008 | Load+Unload+Transport of L.F. from 50 km to 250 km | sq m | 5000 |
|   | 0009 | Transport of Office Equipment Within the Building | sq m | 60000 |
|   | 0010 | Load+Unload+Transport of O.E. Within Location | sq m | 15000 |
|   | 0011 | Load+Unload+Transport of O.E. up to 50 km | sq m | 15000 |
|   | 0012 | Load+Unload+Transport of O.E. from 50 km to 250 km | sq m | 5000 |
|   | 0013 | Pack+Unpack Office Equipment | sq m | 5000 |
|   | 0014 | Storage of Removal Goods | sq m | 5000 |
|   |   | 02 Transport of Machinery |   |   |
|   | 0001 | Provision Low-Loader per Commenced Hour | h | 500 |
|   | 0002 | Provision Special Crane per Commenced Hour | h | 300 |
|   | 0003 | Provision Special Air Cushion per Commenced Hour | h | 200 |
|   | 0004 | Provision Special Tools per Commenced Hour | h | 100 |
|   | 0005 | Provision High Lift Truck per Commenced Hour | h | 500 |
|   | 0006 | Special Crane Operator per Hour | h | 300 |
| Items → | 0007 | Low-Loader Driver per Hour | h | 500 |
|   | 0008 | High Lift Truck Driver per Hour | h | 500 |
|   | 0009 | Hourly Rate Average Wage | h | 500 |
|   |   | 03 Provisioning and Surcharges |   |   |
|   | 0001 | Heavy-Duty Goods Surcharge Over 100 - 200 kg | - | 300 |
|   | 0002 | Heavy-Duty Goods Surcharge Over 200 - 300 kg | - | 200 |
|   | 0003 | Heavy-Duty Goods Surcharge Over 300 - 400 kg | - | 100 |
|   | 0004 | Heavy-Duty Goods Surcharge Over 400 - 500 kg | - | 50 |
|   | 0005 | Night Shift Surcharge | h | 5000 |
|   | 0006 | Sundays & Public Holidays Surcharge | h | 5000 |
|   | 0007 | Provision of Furniture Van w/Driver | h | 5000 |
|   | 0008 | Provision of Trailer | h | 5000 |
|   | 0009 | Hourly Rate Qualified Personnel | h | 5000 |
|   |   | 04 Rates for Material |   |   |
|   | 0001 | No-Return Delivery Cardboard Boxes up to 80 ltr. | - | 500 |
|   | 0002 | No-Return Delivery Protective Covers | sq m | 300 |
|   | 0003 | No-Return Delivery Plastic Wrap | sq m | 200 |
|   | 0004 | No-Return Delivery Wrapping Paper | kg | 100 |

↑ Item Number  ↑ Short Text

FIGURE 6a

| 4 | 5 | 6 | 7 | 8 | 9 |
|---|---|---|---|---|---|
| Amount | Ideal Price | Average | Bidder 1 | Bidder 2 | Bidder 3 |
|  | $3.641.070 | $4.949.494 | $4.238.900 | $4.927.442 | $5.682.140 |
|  |  |  |  |  |  |
|  | $2.906.450 | $4.027.733 | $3.397.500 | $4.023.200 | $4.662.500 |
| 80000 | $685.600 | $908.533 | $760.000 | $685.600 | $1.280.000 |
| 60000 | $637.800 | $832.600 | $660.000 | $637.800 | $1.200.000 |
| 15000 | $225.000 | $329.750 | $225.000 | $404.250 | $360.000 |
| 10000 | $220.000 | $359.000 | $220.000 | $497.000 | $360.000 |
| 5000 | $40.650 | $62.717 | $47.500 | $40.650 | $100.000 |
| 5000 | $48.750 | $71.250 | $55.000 | $48.750 | $110.000 |
| 5000 | $75.000 | $113.317 | $75.000 | $124.950 | $140.000 |
| 5000 | $110.000 | $179.933 | $110.000 | $239.800 | $190.000 |
| 60000 | $348.000 | $395.200 | $420.000 | $417.600 | $348.000 |
| 15000 | $112.500 | $127.100 | $135.000 | $133.800 | $112.500 |
| 15000 | $123.000 | $211.250 | $180.000 | $330.750 | $123.000 |
| 5000 | $54.000 | $121.717 | $95.000 | $216.150 | $54.000 |
| 5000 | $203.000 | $267.983 | $340.000 | $222.950 | $241.000 |
| 5000 | $23.150 | $47.383 | $75.000 | $23.150 | $44.000 |
|  | $147.600 | $168.600 | $147.600 | $147.600 | $210.600 |
| 500 | $22.500 | $28.333 | $22.500 | $22.500 | $40.000 |
| 300 | $24.000 | $28.000 | $24.000 | $24.000 | $36.000 |
| 200 | $5.200 | $5.200 | $5.200 | $5.200 | $5.200 |
| 100 | $1.500 | $2.333 | $1.500 | $1.500 | $4.000 |
| 500 | $10.000 | $14.333 | $10.000 | $10.000 | $23.000 |
| 300 | $15.000 | $16.800 | $15.000 | $15.000 | $20.400 |
| 500 | $25.800 | $26.867 | $25.800 | $25.800 | $29.000 |
| 500 | $21.000 | $23.000 | $21.000 | $21.000 | $27.000 |
| 500 | $22.600 | $23.733 | $22.600 | $22.600 | $26.000 |
|  | $585.700 | $751.147 | $691.900 | $754.141 | $807.400 |
| 300 | $2.400 | $4.900 | $9.900 | $2.400 | $2.400 |
| 200 | $720 | $8.077 | $12.000 | $8.232 | $4.000 |
| 100 | $480 | $6.195 | $9.000 | $5.586 | $4.000 |
| 50 | $300 | $5.258 | $6.000 | $3.773 | $6.000 |
| 5000 | $11.250 | $18.750 | $25.000 | $11.250 | $20.000 |
| 5000 | $22.550 | $37.517 | $50.000 | $22.550 | $40.000 |
| 5000 | $325.000 | $371.617 | $340.000 | $374.850 | $400.000 |
| 5000 | $33.000 | $79.333 | $50.000 | $98.000 | $90.000 |
| 5000 | $190.000 | $219.500 | $190.000 | $227.500 | $241.000 |
|  | $1.320 | $2.014 | $1.900 | $2.501 | $1.640 |
| 500 | $1.000 | $1.240 | $1.000 | $1.520 | $1.200 |
| 300 | $150 | $387 | $450 | $471 | $240 |
| 200 | $50 | $231 | $300 | $314 | $80 |
| 100 | $120 | $155 | $150 | $196 | $120 |

Ideal Price / Average     Selection of Bids for Evaluation

FIGURE 6b

| Bids | | Ideal Price | | Bidder 1 | | Deviations in % |
|---|---|---|---|---|---|---|
| LV | Moving Services | $ | 3.641.070 | $ | 4.238.900 | |
| 01 | Furniture Removal | $ | 2.906.450 | $ | 3.397.500 | 17% |
| 0001 | Transport of Office Furniture Within the Site | $ | 685.600 | $ | 760.000 | 11% |
| 0002 | Load+Unload+Transport of O.F. Within Location | $ | 637.800 | $ | 660.000 | 3% |
| 0003 | Load+Unload+Transport of O.F. up to 50 km | $ | 225.000 | $ | 225.000 | 0% |
| 0004 | Load+Unload+Transport of O.F. from 50 to 250 km | $ | 220.000 | $ | 220.000 | 0% |
| 0005 | Transport of Laboratory Furniture Within the Building | $ | 40.650 | $ | 47.500 | 17% |
| 0006 | Load+Unload+Transport of L.F. Within Location | $ | 48.750 | $ | 55.000 | 13% |
| 0007 | Load+Unload+Transport of L.F. up to 50 km | $ | 75.000 | $ | 75.000 | 0% |
| 0008 | Load+Unload+Transport of L.F. from 50 to 250 km | $ | 110.000 | $ | 110.000 | 0% |
| 0009 | Transport of Office Equipment Within the Building | $ | 348.000 | $ | 420.000 | 21% |
| 0010 | Load+Unload+Transport of O.E. Within Location | $ | 112.500 | $ | 135.000 | 20% |

FIGURE 7

METHOD AND SYSTEM FOR MANAGING INVITATIONS TO BID

This application is based upon and claims priority from German patent application No. 10052214.9, filed Oct. 20, 2000, the contents being incorporated herein by reference.

BACKGROUND OF THE INVENTION

1. Field of the Invention

The present invention relates generally to systems for soliciting bids for the delivery of goods and services, and more particularly, to a system for constructing, distributing, and evaluating bids for the delivery of goods and services.

2. Background Information

Soliciting bids for the delivery of goods at some future time or for performing a future service has long been a common practice in both business and in personal transactions. Businesses and individuals alike prefer to know the cost of a particular product or service prior to committing to the purchase of the same, not only for purposes of deciding whether or not to make the purchase but also for budgeting for the product or service. Furthermore, multiple sources from which to select various products and services are preferred since the type and quality of products and services can vary by supplier.

Within the meaning of the present application, products and services can include any and all types of products and services that can be offered for sale by one party (vendor, seller, or bidder) and can be purchased or paid for by another party (buyer or user). An invitation or a request to submit bids for providing buyer-sought products and/or services is intended to represent buyer-determined specifications for the products and/or services preferred to be acquired by the buyer. The invitation to bid can be very specific, such as specifying the times and dates for performance and the detailed requirements for the particular products and services that will be required to satisfy the terms of the bid. For example, the invitation to bid can be for the proposed cost for scraping and painting a ship due into port on a particular date, with the refurbishing of the hull of the ship to be completed within five days. Or, the invitation to bid can be for the construction of a house, to conform to specific blue prints and materials requirements, to be built on the buyer's lot and to be ready for occupancy no later than six months after excavation for the basement commences.

The process of acquiring products and services via bids begins with a buyer or party determining the specifications, features, and limitations for the particular product(s) and/or service(s) sought, followed by reducing these criteria to a verbal or written invitation, solicitation, or request for bid. Within the meaning of the present application, these desired products and services will be collectively referred to as a list of performances. Compiling a list of requested performances can be very time-consuming, especially if the project being bid is complex, such as the construction of a twenty-story commercial building. The wording on the invitation is important so that the buyer and the bidder have a common understanding of the products or services that are being solicited. Otherwise, not only will the submitted bids not conform to the buyer's intentions, but the delivered products and performance will also be contrary to what the buyer expected to receive and for which the buyer anticipated being obligated to pay.

For the sake of consistency, the present application will use the term, "buyer," to represent the party soliciting for bids to perform a certain project or service or to deliver a certain product. The term, "bidder," will be used herein to represent the seller or vendor responding to the invitation to bid with a price and time quote for delivery of the requested product or service.

The process of drafting an invitation, solicitation, or request for bid can be simple, in the case of soliciting bids to mow a lawn during the summer; or can be complex and time-consuming, such as pricing the cost and time to construct a twenty-story commercial building. When complex bidding is involved, the buyer must devote a tremendous amount of time drafting the invitation, ensuring that all possible products and services are included, as well as procedural requirements, product quality requirements, performance specifications, and timing for delivery at various stages. Often the project being bid out is complex and unique, and the drafting of the solicitation is a custom process, with no means to incorporate past experiences by which the current bids may be evaluated.

The desired list of performances or products is usually reduced to writing and distributed to a plurality of potential bidders who the party inviting for bids takes into consideration for providing the products and services requested in the list of performances. Another difficulty with present systems for soliciting bids is communicating the request for bid to qualified bidders. Once drafted, the invitation to bid must be made known to a potential bidder to be effective. Traditionally, invitations to bid have been either verbal or in writing, and have been directed to specific, known vendors operating in the subject area of the products or services desired. Alternatively, the invitations have been broadly distributed through media publications and trade organizations to inform potential bidders of an opportunity to respond with an offer to supply particular products and services. Unfortunately, such a broadcast disclosure process both misses qualified bidders and invites unqualified bidders to submit a bid.

Once a potential bidder is aware of the terms of the invitation to bid, the potential bidder must evaluate the list of required performances or products to be supplied and must calculate the price at which the performances can be fulfilled or the products delivered, plus a profit margin. The bidder often accomplishes this calculation by estimating a price for each portion of the required performance or individual items requested. The total price is tabulated, and a portion is added for a profit margin and/or for contingencies, such as weather, delays, and labor problems. The completed bid is then sent by the bidder to the party inviting for bids ("buyer").

Upon receiving the bids, the buyer must evaluate each of the bids to decide which bidder will be accepted to perform the requested service or deliver the needed products. However, the cost of performance to the buyer includes more than the simple price of the service or products to be provided. The buyer must also evaluate the bidder to determine if the bidder is qualified to perform under the subsequent contract and to determine the likelihood that the bidder will perform satisfactorily, such as on time, within budget, and with requisite quality. Often, however, the buyer has limited or no knowledge regarding how a particular bidder has previously performed in providing a service or products similar to the current subject of the bid. Therefore, the buyer has little information with which to forecast the quality of the delivered product or service as provided by a particular vendor.

A thorough bid analysis also requires checking the details of each bid against the corresponding prices quoted by the other bidders to determine how the prices quoted by individual bidders vary from each other. It is possible that a particular bid may not be the most favorable bid in view of the total amount but turns out to be the bid from which the buyer can expect the best result in terms of a price-performance ratio. Such an evaluation, however, is difficult and can only be carried out with relatively great effort under present bid evaluation processes.

For unique and complex projects, the buyer has a very difficult task attempting to estimate the appropriate cost range for the project, against which the received bids must be compared for acceptance or refusal. The buyer may rely on past contracts, but often the past contracts are at least somewhat different regarding the product or service to be acquired. Additionally, the buyer may not be able to remember particular past contracts or the details of the contracts. Furthermore, price reductions, discounts, and considerations will often vary from project to project, across time, and across geographic regions, thereby making the comparison between past contracts and the present bid project very difficult to accomplish accurately and easily. In some cases, price lists for certain products and services may be available to the buyer. However, it takes a comparatively great effort to estimate the costs to fulfill a particular list of performances or to deliver a specific list of products. Therefore, for a variety of reasons, the buyer often has limited or no criteria against which to compare the bid prices and times for delivery to determine whether a particular bid is a good candidate for acceptance.

Another difficulty in the bid process is that no matter how precise and demanding the invitation for bid may be, not all responding bidders submit bids in accordance with the invitation to bid, making the evaluation process difficult at best, as the buyer attempts to compare apples and oranges to determine the best bid to accept. Regardless, following the evaluation of all submitted bids, a bidder is selected to deliver the products and/or to fulfill the service, often based solely on the price bid for the products or services.

These and other drawbacks, problems, and limitations of conventional products are overcome according to exemplary embodiments of the present invention.

SUMMARY OF THE INVENTION

The present invention is directed toward a system and method for managing the drafting and evaluation of invitations to bid for the delivery of one or more products and/or the performance of one or more services. The buyer or user of the inventive bid system has an object file of products and services from which he or she can select to compile the bid, with the file including detailed information regarding specifications and pricing. A historical file is also available to the inventive system, containing information regarding past invitations, past bids received from bidders, and past performance of accepted bids and contracts by bidders. Once the invitation to bid is drafted, it is communicated to a plurality of potential bidders over a network. Bids drafted in response to the invitation to bids are received across the network and are evaluated for matching against the invitation to bid criteria, for offered products and services, for time of performance, for cost, for vendor performance, and against other bids. The best bid based on price, timing, and past performance is selected, and the successful bidder is notified. During contract execution, the performance of the bidder is monitored, with the results being added to the past performance information in the historical bid management file. The process continues with multiple projects, bids, bidders, contracts, and performance, with the products and services file and the historical file expanding with information gleaned from awarded bids and performed contracts. In such a manner, the system "learns" from past experience, all to the benefit of the buyers, bidders, and third party users.

In accordance with one aspect of the invention, a system and method are directed toward a system and method for fulfilling an invitation for bids of at least one performance to be effected by a bidder against payment, including providing a database, comprising at least one performance description and at least one price description for each of a plurality of predetermined performances; generating a list of performances desired by a buyer by selecting at least one of the predetermined performances from the database and by including the respective performance description in the list of performances; forwarding the list of performances to a plurality of bidders; receiving a bid from at least one of the plurality of bidders, each received bid including a bid price determined by the bidder and assigned to at least one performance description of the list of performances, the bid price stating the price to be paid to the bidder for effecting the respective performance by the bidder; evaluating the received bids and selecting a bid from the bids received; and updating the database such that, for each performance of the generated list of performances for which a bid is selected, the price description in the database corresponding to said performance is modified to reflect the selected bid.

In accordance with another aspect of the invention, a system and method are directed toward a system and method for conducting invitations for bids for at least one contract awarder, wherein the bidding method is carried out for at least one performance to be effected by a bidder, including a data storage device storing at least performance descriptions and price descriptions, wherein assigned to a plurality of predetermined performances there is stored at least one performance description and one price description for effecting the performance; a communications device forwarding performance descriptions selected from the stored performance descriptions to a party submitting an invitation for bids; a first receiving device receiving a list of performances, from the party submitting an invitation for bids, generated from the forwarded performance descriptions; a first transmission device forwarding the list of performances to a plurality of bidders; a second receiving device receiving bids from at least one bidder of the plurality of bidders, each bid comprising at least one bid price determined by the bidder, which bid price is assigned to a performance description of the forwarded list of performances, which bid price states the amount to be paid to the bidder for effecting the respective performance by the bidder; a second transmission device transmitting the received bids to the party submitting the invitation for bids; a third receiving device receiving information regarding a bid selected by the party submitting the invitation for bids; and an update device updating the price descriptions stored in the data storage device based on at least one bid price of the bid selected by the party submitting the invitation for bids.

In accordance with yet another aspect of the invention, a system and method are directed toward a system and method for managing an invitation for bids for at least one performance to be effected by a bidder, including archiving a plurality of performances in a descriptions database, wherein each archived performance includes a performance description; generating a list of desired performances from the archived performances; distributing the generated list of performances to a plurality of bidders; receiving a bid submitted from at least one of the plurality of bidders, wherein each submitted bid includes a price assigned to at least one of the distributed list of performances and wherein the assigned price is the bid price to be paid to the bidder for effecting the respective performance by the bidder; evaluating the received bids and automatically selecting a bid from the bids received; and updating the archived descriptions database with the prices from the selected bid.

BRIEF DESCRIPTION OF THE DRAWINGS

These and other objects and advantages of the present invention will become more apparent and more readily appreciated to those skilled in the art upon reading the following detailed description of the preferred embodiments, taken in conjunction with the accompanying drawings, wherein like reference numerals have been used to designate like elements, and wherein:

FIG. 6a and FIG. 6b is a listing of bid-related information retained by the invention.

FIG. 7 is a listing of percentage deviations between bids for various services and the ideal cost for those services as computed by an embodiment of the invention.

DETAILED DESCRIPTION OF THE PREFERRED EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
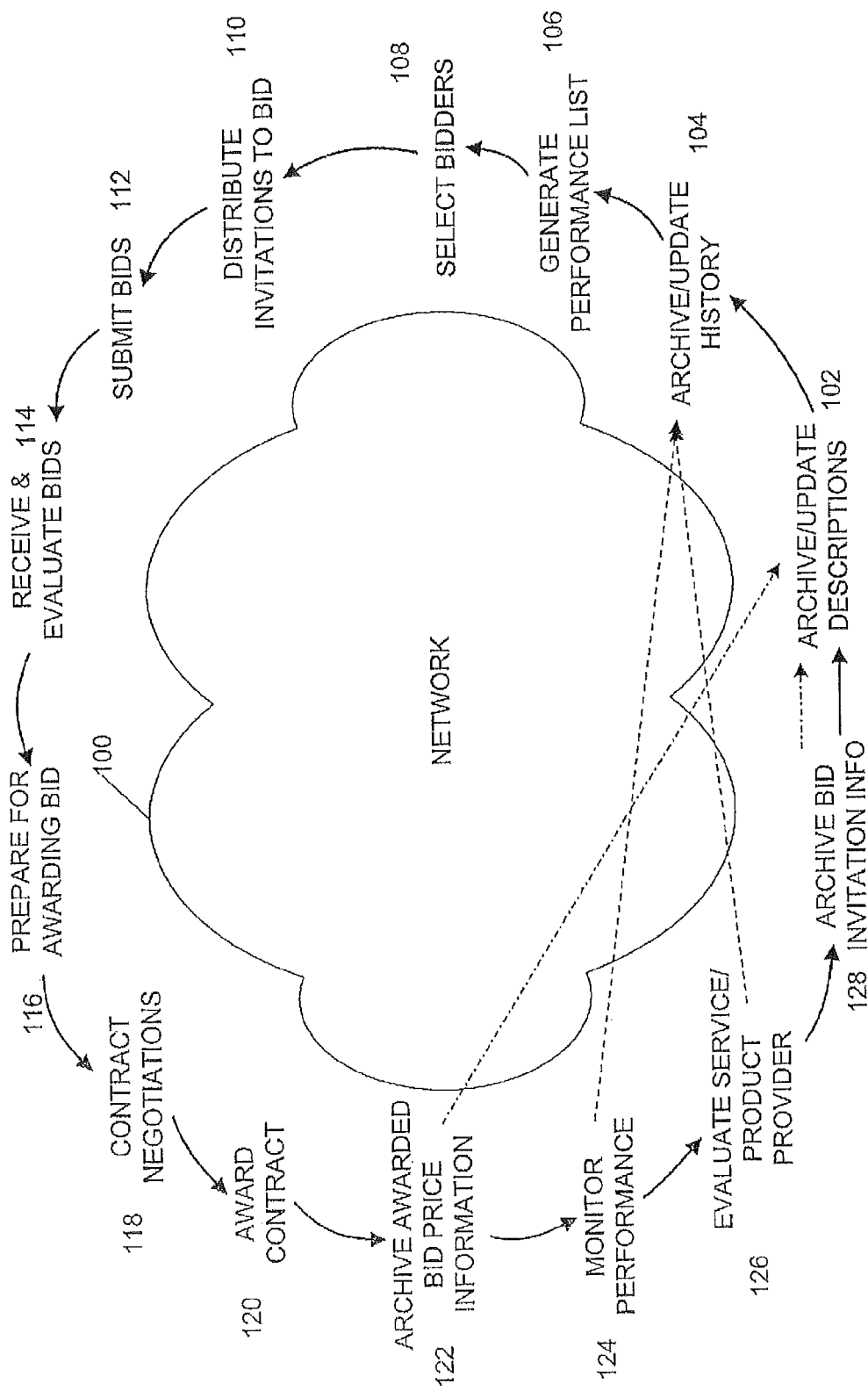
FIG. 1 is a functional flow chart illustrating the steps of the bid submission, bid evaluation, contract awarding, and performance monitoring of a preferred embodiment of the invention.
Figure 2:
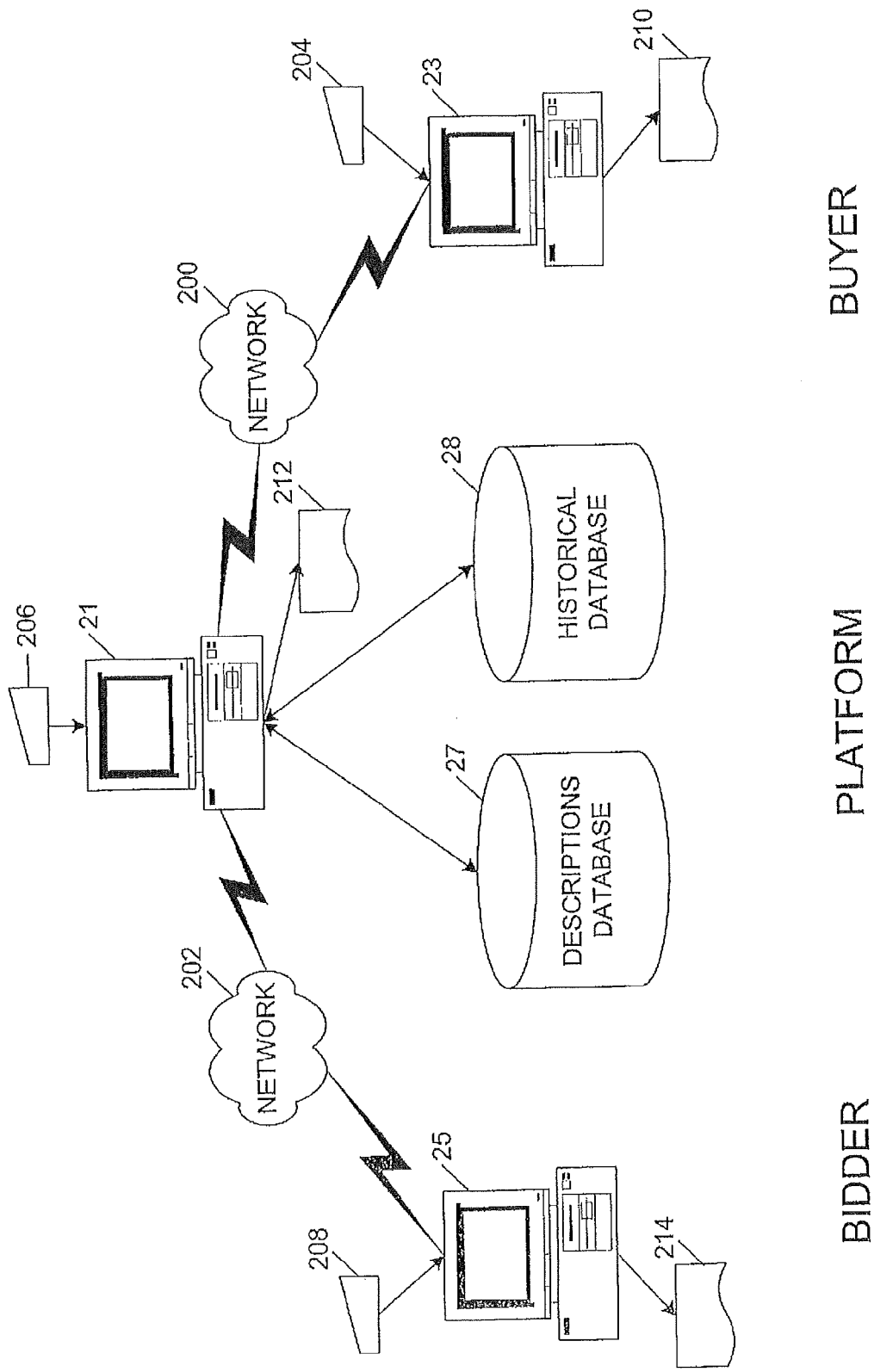
FIG. 2 is a component diagram of the apparatus and the communication links of an embodiment of the invention.

A brief overview of the processing steps of the inventive bid invitation management system will be presented with reference to FIGS. 1 and 2. Referring initially to FIG. 1, there is illustrated both a component diagram of the apparatus and communication links that comprise a preferred embodiment of the present invention and also the overall flow of processing that occurs within the inventive bid management system. Processing begins with the creation, in steps 102 and 103, of two key databases that are used throughout the system. The first database (shown as descriptions database 27 in FIG. 2) contains detailed information, including descriptions and prices, regarding the products and services sought by buyers utilizing the system. The second database (shown as historical database 28 in FIG. 2) contains bidder information, including historical information regarding past bidder performance and past bids that have been accepted within the knowledge of the system and its users. An invitation to bid is developed by the system through the information residing on the databases 27 and 28 and distributed to potential bidders in steps 106-110. The responses, or bids, are received and evaluated in steps 114-116. The contract is awarded to the successful bidder after contract negotiations, if any, in steps 118-120. During the life of the contract, the bidder's performance in delivering the contracted services and/or products is monitored at step 124, with relevant bidder performance information being added to the bidder history file 28. At the completion of the contract, at step 126, the overall performance of all parties under the contract is evaluated, with the results being added to the history database 28. The process repeats itself, beginning with step 102, with any additions to the service/product description file having been provided during the bid award and performance monitoring steps.

Referring briefly to FIG. 2, there is shown the apparatus and data communication paths utilized by the inventive bid management system. The components of FIG. 2 are intended to be exemplary rather than limiting regarding the devices and data or communication pathways and links that can be utilized in embodiments of the present inventive system. Each of the computers 21, 23, and 25 have the capabilities of multiple (i.e., first, second, third) transmission and receiving devices for effecting the communication of data between the respective computers 21, 23, and 25 of the bid management system. Similarly, the processors of each of the computers can be viewed as specialized, intelligent devices for effecting various functions within the system, such as fulfilling the roles of selection devices, update devices, and evaluation devices.

Figure 3:
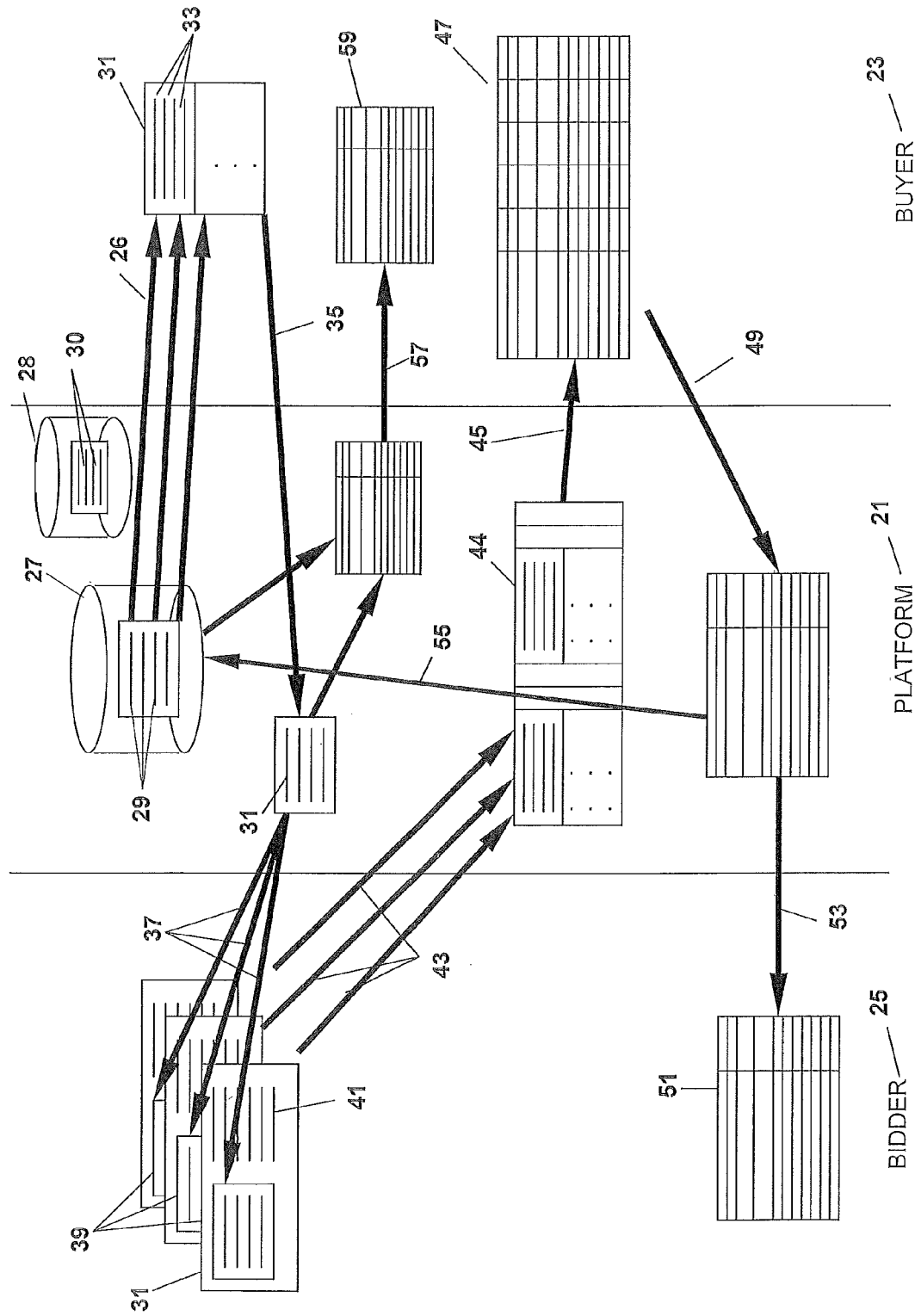
FIG. 3 is a diagram of the data flow and files of preferred embodiments of the invention.

Still referring FIGS. 1 and 2, a more detailed description of the processing and features of the bid management system will be presented. The inventive bid management system is configured to operate across a world-wide network 100 so that international buyers and bidders can communicate through a platform computer 21 with each other and conduct the document and information exchanges that are necessary in a thorough bid invitation, response, evaluation, award, and evaluation process, as is provided by preferred embodiments of the present management system. The network 100 can be a hard-wired network, a wireless network, a local area network, a wide area network, an intranet, the Internet, or any combination thereof. The key to the system are the databases 27 and 28, where all bid- and performance-related information is respectively retained. While the FIGS. 2 and 3 show the descriptions database 27 and the historical database 28 as being separate, distinct databases, these databases can be combined onto a single storage device without detracting from the inventive features of the present bid management system. Similarly, the information and files maintained on the databases 27 and 28 can be distributed across a plurality of separate files, databases, and storage devices linked together across the network 100, also without detracting from the inventive features of the present bid management system. Furthermore, as discussed more thoroughly below, the resources and the functions of the platform computer 21 and the buyer computer 23 can be combined into a single resource without detracting from the inventive features of the present bid management system.

The bid management system shown in FIG. 1 commences at step 102 with the building of the service/product descriptions database 27 (as shown in FIGS. 2 and 3 and referred to hereinafter as the "descriptions database"). Initially, the detailed information stored on the descriptions database 27 regarding services and products available to be bid under the present bid management system is input from external sources (not shown), including product catalogs and price lists, user knowledge, trade publications, and buyer input by means of the buyer computer 23 and its respective input device 204. During processing of the present bid management system, information developed by the system in the form of specific bid information and pricing is used to automatically update and expand the information on the descriptions database 27 in steps 122 and 128. Bidder performance information is also gleaned from the processing of the system and is added to the historical database 28 at steps 124 and 126. In this manner, contemporary and updated information is continuously available for the bid generation 106 and bid evaluation 114 steps. Additionally, as new information comes available in the form of new and modified price lists, projects, services, and products, the descriptions database 27 can be updated across the networks 200 and 202 in step 102 to remain current. Input means 204, 206, and 208 are also available for manual input of new and updated information by the respective users of the buyer, platform, and bidder computers 23, 21, and 25. Such update access is secured and restricted through the use of ID's and passwords. In this manner, the range of services and products available to be bid by the bid management system can dynamically expand without modifying any of the software controlling the process steps of the inventive system and methods.

Figure 4A:
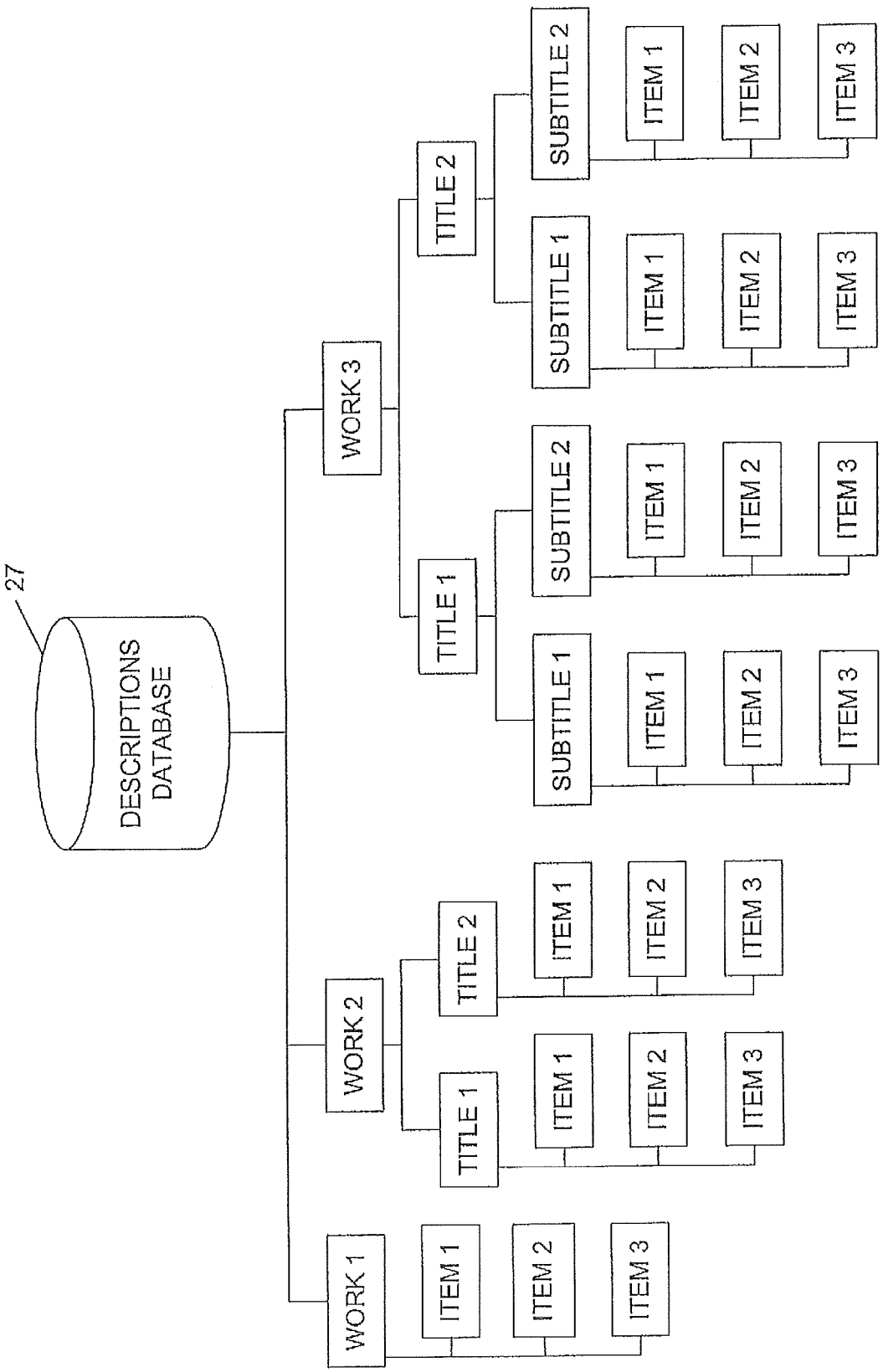
FIG. 4, which is comprised of FIGS. 4a to 4d, illustrates the data format and structure of information maintained in storage and utilized by preferred embodiments of the invention.
Figure 4C:
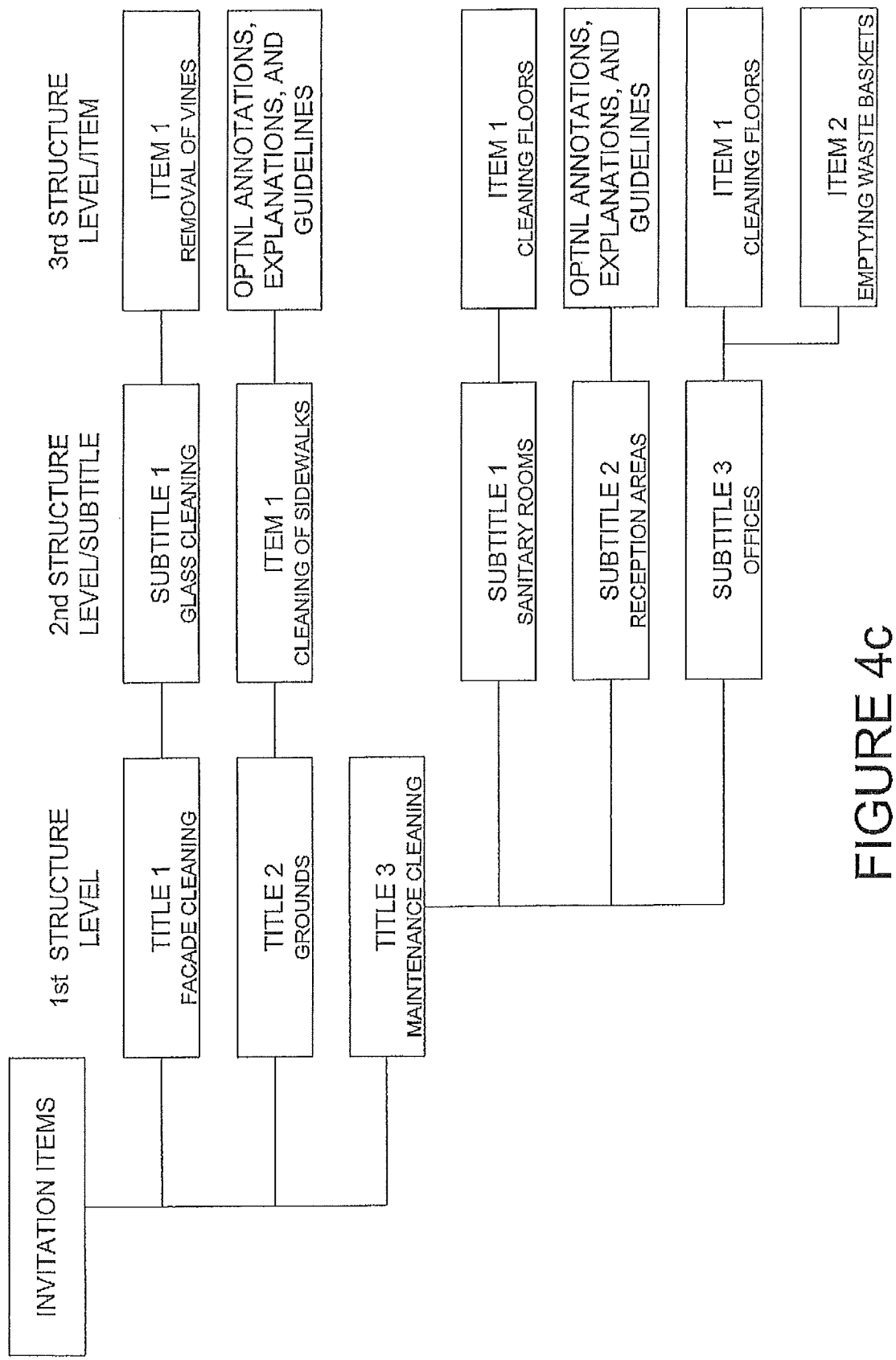

The descriptions database 27 is preferably a hierarchical database whose data structure is shown in FIGS. 4a-4d and 5. Details of an exemplary content of the descriptions database 27 are shown in FIG. 6. Referring now to FIG. 4a, the individual services or performances to be requested under the bid management system are termed "items," a plurality of items being subordinated to one "subtitle" each; a plurality of subtitles being assigned to one "title;" and a plurality of titles being subordinated to a "work." As can be seen from FIGS. 4a and 4c, some levels of hierarchy can be omitted for some products and services, depending on the particular product or service and the level of detail or breakdown desired by the user. For example, several items can be directly subordinated to a title, and several items can be directly subordinated to a work. An example of a work service, as shown in FIGS. 4b, 4c, and 6, is the broad category of "Cleaning" or "Moving Services." Within each work are titles, such as facade cleaning or furniture removal. Breaking the potential services to be bid even further into subtitles, FIG. 4c shows glass cleaning and sanitary rooms under facade cleaning and maintenance cleaning, respectively. Under each of these subtitles are the individual items or services to be bid, such as emptying waste baskets.

Figure 5:
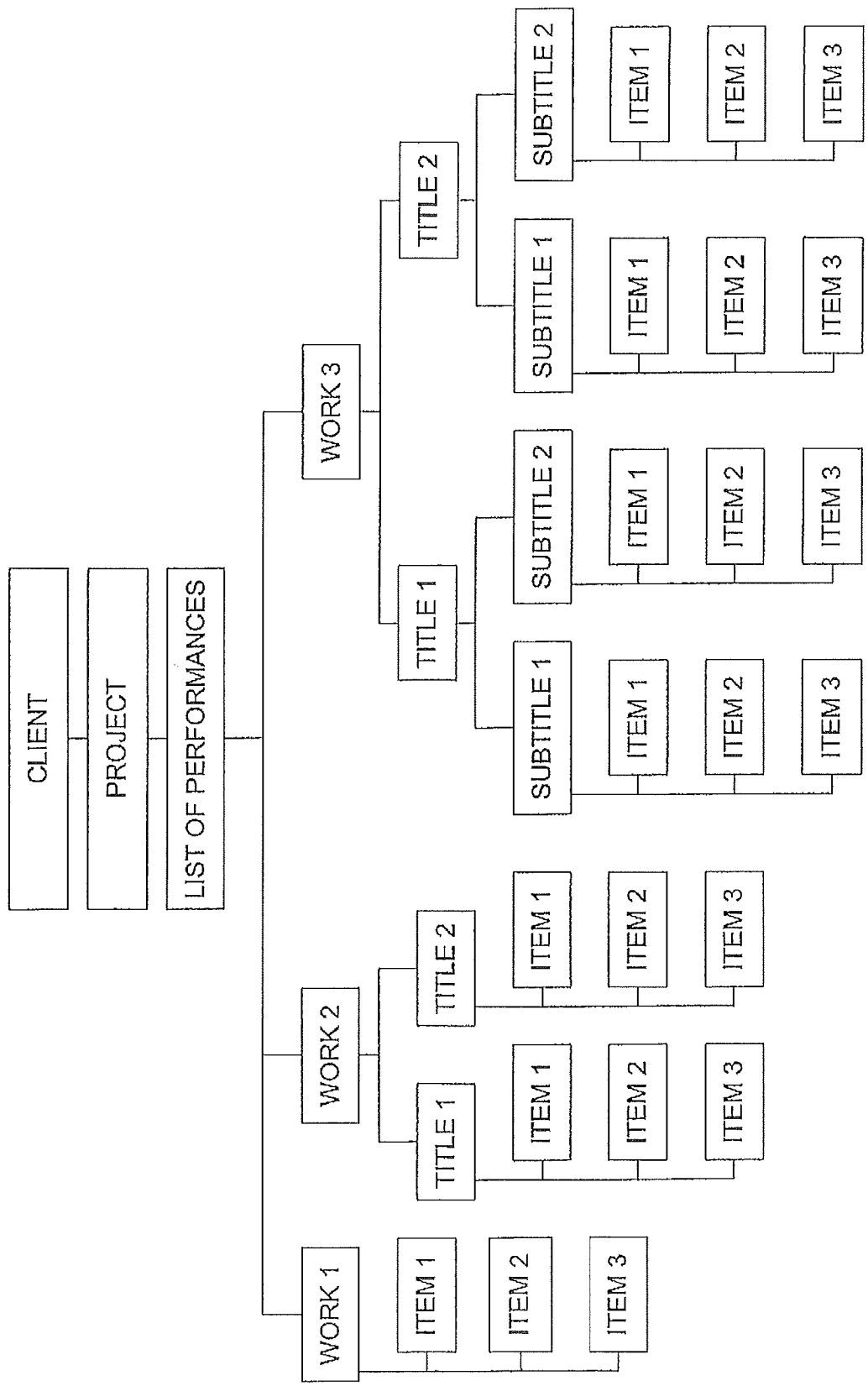
FIG. 5 is structural diagram illustrating the components and subcomponents comprising an exemplary project that is available for bidding by an embodiment of the invention.

By use of the hierarchical structure, common elements of a project to be bid, whether services or products, can efficiently be accessed by the buyer and the system for use, comparison, and contrast. The data maintained in the descriptions database 27 is optionally organized by client and project as shown in FIG. 5 to facilitate the evaluation and billing for particular projects being fulfilled for particular clients. However, the access to and the use of information in the descriptions database 27 for the bid generation, solicitation, and evaluation process need not have the client and project level to be effectively accessed by embodiments of the present invention. In particular, and referring to FIGS. 4c, 5, and 6, detailed information regarding the cleaning of offices or the moving of furniture, such as specifications and past performance costs and vendors, can be easily accessed through the hierarchical structure of the descriptions database 27. Work 1, Work 2, and Work 3 represent broad categories of products and services, such as vehicles, cleaning, and legal services. In the next data level below the Work level, the Title level specifies categories within the Work level, such as cars/trucks/buses, facade cleaning/grounds cleaning/maintenance cleaning, and contract work/personal injury work/intellectual property work. Underneath the Title level is the Subtitle level, where the products and services are further broken down or detailed, such as sanitary rooms cleaning/reception areas cleaning/offices cleaning. Once again, the data objects can be further detailed below the Subtitle level to the Item level, such as floor cleaning/emptying waste baskets. As can be seen in FIG. 5, any of these layers of detail can be eliminated for particular product and service areas in those categories that do not require the level of detail, such as mining down to the emptying waste basket level shown in FIG. 4c.

Figure 4D:
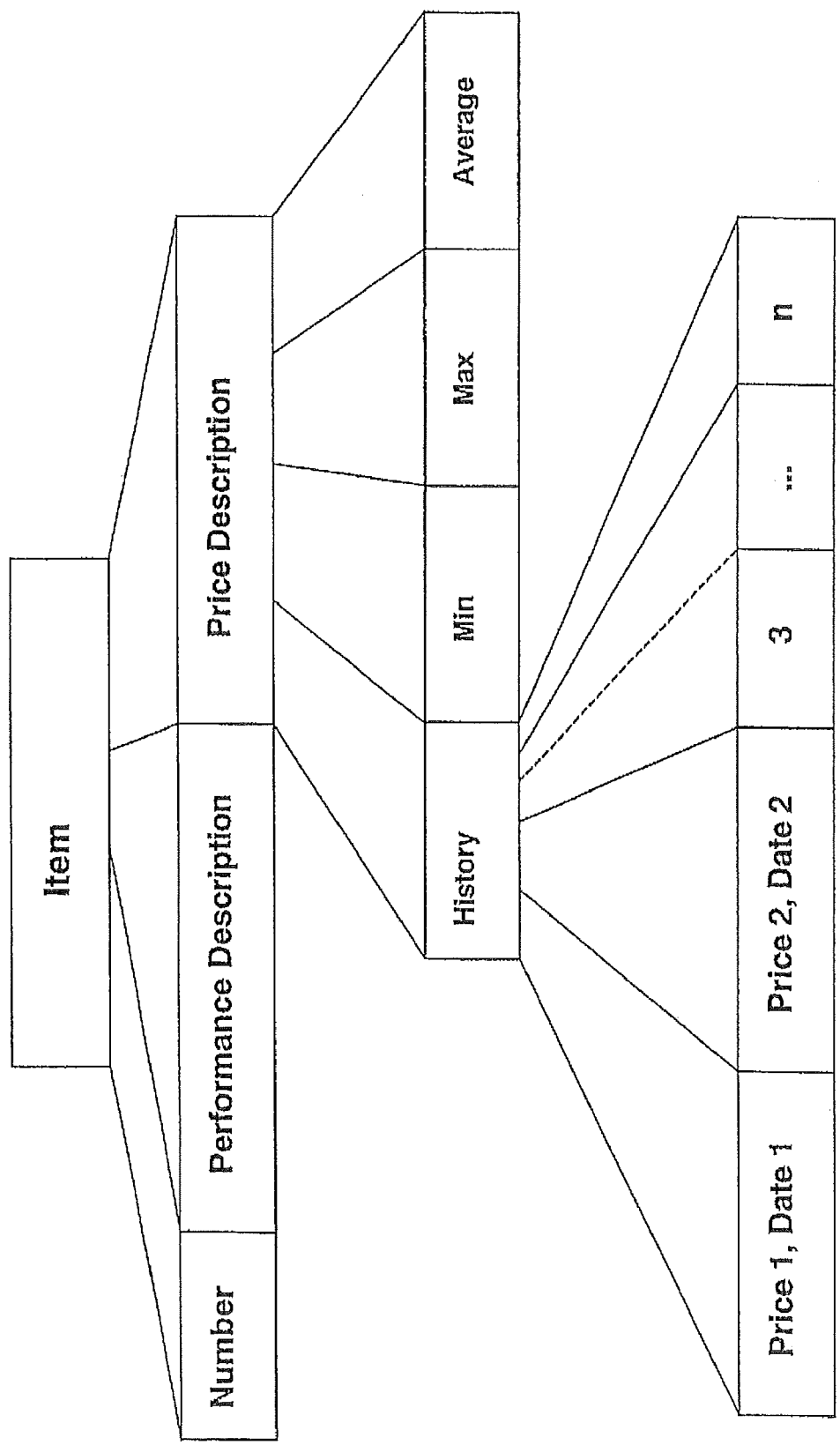

The information retained at the item level of the structure illustrated in FIG. 5 is detailed in FIGS. 4d and 6. The content of each item comprises a unique item number, at least one performance description, and at least one price description. The performance description or short text is a standardized text describing the particular product or service to be delivered, such as a red permanent marker or the emptying of waste baskets in offices. This information, as shown in FIG. 6 and structurally in FIG. 4b, includes all specifications of the product or service and is precise and consistent to permit comparison between the bid invitation and the delivered product or service. The price description includes an archive of past bids for the particular product or service, which can be used in preferred embodiments of the present invention to calculate an estimate of not only what the bid price should be but also the stream of payments to compensate for the services and products that are delivered across the time of a contract. The price description field indicates the bid and actual (if different from the bid price) price of all past bids for the particular product or service. This data is gained not only from the initial archiving of the descriptions database 27 at step 102 but also from the results of past bidding under the bid management system, the bid prices being those prices that were accepted in the awarding of a contract at step 120 and subsequently loaded onto the database 27 at step 122. The price description field includes a plurality of concatenated price histories, with each history comprising the date the bid price was received, the price itself, the vendor or bidder, whether the bid was accepted, and, if so, the price as delivered. Thus, the price description can be stored and utilized as a historical overview of prices bid in the past together with the date when the contract was made or the performance was effected. Further, the price description can include minimum price, maximum price, and average price.

For example, a performance description, such as "cleaning of 1 $yd^2$ of carpeting," can be accompanied by a price description including the following data: $2.05 per $yd^2$ on Jul. 7, 1998; $3.10 per $yd^2$ on Sep. 5, 1998; and $1.70 per $yd^2$ on Mar. 1, 1999. The prices in this example relate to charges for cleaning a square yard of carpeting. The system is also capable of computing the cost per unit when the bid price is archived and/or submitted in the form of an hourly performance rate and an hourly charge rate. The amount of performance per hour is also known as the guiding performance description. In this price-forming feature, the bidder can submit a bid production rate of 5 $yd^2$ per hour and an hourly price rate of $30.00 per hour. The system easily divides the production rate into the hourly rate to determine the unit bid price of $6.00 per $yd^2$. In this manner, the bid management system is not restricted to accepting singular price forms. Furthermore, the system accommodates multiple production rates for which unit prices can be calculated for related service items. A performance rate of 5 $yd^2$ per hour would include an intensive and thorough cleaning, which is to be carried out once a year, for example, whereas a guide performance of 60 $yd^2$ per hour describes a standard cleaning to be done daily. The specified charge per hour can further be broken down into a portion attributable to a scale wage and a portion attributable to the bidding company's overhead. The scale wage is the hourly labor wage that has been negotiated, for example, for a particular geographic area between an employer and a trade union. The company overhead breakdown of the bid price consists of ancillary wage costs, machine and equipment overhead, administration and supervisory overhead, and a profit margin for the company. With this detail available, the evaluation of the bids can be very thorough and the inventive system can utilize this data to highlight distinctions between bids that can be helpful in the contract negotiation phase at step 118.

Minimum, maximum, and average price values can be recalculated each time the price history of the descriptions database 27 is updated, whether through the archiving performed at steps 126 and 128 or the manual archiving accomplished at step 102, and stored in the descriptions database 27 for quick access. For example, column 6 of FIG. 6 shows average price. However, it is also possible for the system to store only the raw pricing data and calculate minimum, maximum, and average price values from the history only when required. It is also possible to store a history in the archive which is not detailed and, instead comprises only merely minimum, maximum, and average values, which are then updated correspondingly at each modification/archival of the price description data.

The descriptions database 27 also contains regionally-dependent parameters and factors which include regionally-dependent costs, such as scale wages, cost of living, index of building costs, etc. Such parameters and factors can be obtained from organizations specialized in statistical recording, such as a census bureau or a bureau of statistics, and input through input means 204 or 206 or optionally across the network 200 to the platform computer 21. Thus, it is possible to store prices in the descriptions database 27 related to individual performance descriptions which are not dependent on any particular geographic region or area and utilize the regional parameters to calculate a realistic price estimate for a particular region as the basis for evaluating bids to be performed in a particular region. In reverse, regionally submitted bid prices can be adjusted to a standard price base level by the use of the regional parameters corresponding to the region from which the prices were submitted, thereby effecting a price correction feature facilitating the equitable comparison of bid prices emanating from a plurality of regions. A similar method is used for determining the annual rate of price increase in that the stored prices are related to a cut-off date, for example Jan. 1, 1990, and the annual price increases are taken into consideration by multiplication with a statistically determined annualized price increase factor, such as a consumer price index or an adjusted inflation index. In this manner, pricing from previous years can be utilized to compare against current bid prices.

The bidder performance history database 28 (hereinafter "historical database") is initially built at step 104 with information known to the user, including past experiences with particular bidders and information regarding which bidders are known to, or represent themselves as, providing specific services and products. As will be discussed below, the information on the historical database is automatically updated, archived, and increased through the steps 124 and 126 of evaluating the performance of the bidders under the awarded contracts. Additionally, the system also provides at step 104 for the manual entry of relevant performance information that is acquired outside the realm of the present system, such as information regarding the failure of a particular bidder to perform satisfactorily under a contract that was not awarded within the present inventive system. Such input can be manually input via the buyer or platform input means 204 and 206, respectively.

Referring now to FIGS. 1, 2, and 3, the components and data and communication links that comprise the bid management system are shown. The bidding method is made available via a network platform 21 which is based on the previously described archival databases 27 and 28. In FIG. 3, the descriptions database 27 and the historical database 28 are both shown as storing a plurality of items 29 and 30, respectively. A buyer utilizing a buyer's computer 23 communicates across the network 200 with the platform computer 21, as does one or more bidders utilizing bidder computers 25 across the respective network 202. Preferably, the networks 200 and 202 are the Internet, but could be any known and combination of network systems and protocols for communicating electronically across a distance. The buyer as well as the bidder have secured and restricted access to the network platform 21, which provides communication links between the buyer and the bidders necessary to effect the steps of the bid management system. This controlled access is provided by previously-issued ID's and passwords. Further, transmissions across the networks 200 and 202 can be secured through known encryption, compression, and digital signature security techniques to ensure the data and information flowing through the system is protected from unauthorized access. Typically, the resources of the platform computer 21 control the distribution and monitoring of ID's, passwords, encryption keys, and digital signatures. In the present embodiment represented by FIGS. 2 and 3, direct communication between the buyers' computer 23 and the bidder's computer 25 is not possible in the scope of the method described here to avoid abuse or irregularities in the bidding method.

In one embodiment of the invention, as discussed more thoroughly below, a third party (hereinafter "manager") manages the operation of the platform computer 21 and its related resources and data; and the buyers and bidders are customers of this third party provider of the bid management system. Such an independent provider of the bid management system facilitates the suppression of irregularities which can occur in conventional invitations for bids. It is possible, for example, for the manager to exclude bids from certain bidders who are suspected to have modified their bids upon learning the content of bids submitted by other bidders, in hopes of gaining an unfair advantage. Therefore, a bid submission and evaluation process managed through the present bid management system can enjoy a particular trust to the advantage of all parties concerned. In an alternate embodiment of the invention, the resources of the platform 21 and those of the buyer, such as the buyer's computer 23, are combined into a single system where the buyer has full authority to direct the processing of the bid management system, has complete access to the databases 27 and 28, and can effect direct communication with the bidders. In this embodiment, it is the buyer who is managing the bid management process, with the aid of the inventive bid management system and its automated data gathering, evaluation, and communication features, as discussed more thoroughly below.

If a buyer wants to renovate a building, for example, and wants to invite bids for performing the renovation, he/she accesses the network platform computer 21 by way of the network 200 as a communication medium, this access being permitted by entry of a predetermined a user ID and a respective password through the buyer's computer 23 in agreement with the platform computer 21. Upon accessing the databases 27 and 28 of the system through the computer 23, the buyer typically is limited to subject areas corresponding to the buyer's business or corresponding to the particular project sought to be bid out. Alternatively, as shown in FIG. 5, a buyer's access can be limited by client or project. In yet another embodiment of the invention, the buyer can have access to all non-propriety information on the databases 27 and 28.

Upon accessing the management system on the platform computer 21 through a protected and/or restricted data connection at step 106, the buyer utilizing his/her computer 23 views a graphic display of a subset of the information on the descriptions database 27, alternatively structured as shown in FIGS. 4a-4d. The buyer can select per mouse click specific works, titles, subtitles, and items and can compile them to form a list of desired performances, whether the project involves the delivery of services or products, or both. Using a "drag and drop" method, the buyer can build its list of performances with entire works or titles and can subsequently delete items or subtitles not required. As shown in FIG. 4B, the description fields for each item that is available to be bid include relevant details regarding each particular item, including required contractual conditions for fulfilling each item, specifications for each item, and sample contracts and contractual terms to which the bidder will be expected to comply. Once built or generated, the list of performances that represents the project or bid desired by the buyer to be fulfilled is stored in a protected and restricted file on the descriptions database 27 and is subsequently accessible only by the buyer and by invited bidders. The buyer can also download the list of performances to the buyer's computer 23 (arrows 26 in FIG. 3). Any changes which the buyer makes in the list of performances are directly transmitted to the platform computer 21 so that on the platform computer 21 there is always the current version of the list of performances generated by the buyer. Thus, it is possible that several people can work on behalf of the buyer on the list of performances at their respective computers 23, without there being any conflicts between the different versions of the list of performances. A list of performances completed by the buyer is represented in FIG. 3 by reference numeral 31 and includes a plurality of items 33. The platform computer 21 is then advised by the buyer that the list of performances is complete, whereupon the list of performances is locked against further changes and its content is forwarded to the platform (arrow 35 in FIG. 3).

The list of performances generated by the buyer contains performances gleaned from the list of performances already stored in the descriptions database 27. While the platform computer 21 is typically endowed with the authority to build and maintain the invitation items and their respective descriptions in the descriptions database 27, buyers can also be granted authority to maintain this information in reserved portions of the database 27. In practice, many circumstances arise when none of the performances available to the buyer from the descriptions database 27 specifies the particular performance needed by the buyer. Therefore, the buyer is provided with the feature for defining a new performance description. The buyer can either author a completely new performance description or can suitably modify an existing performance description. This new performance description then becomes part of the list of performances 31 of the buyer and is treated in subsequent steps of the bid management system similarly to existing performance descriptions with one exception. Since the new performance description is not yet archived in the descriptions database 27, no information such as estimated price is available for the new performance description to assist in the bid evaluation step. This limitation is remedied below in step 128, where the bid information, including any new performance descriptions, are archived in the descriptions database 27.

Once the list of performances is built, the system automatically selects at step 108 potential bidders to invite to bid on the generated list of performances. The system selects the list of potential bidders based on the information archived in the descriptions database 27, which includes by work, title, subtitle, item, and/or item number the services and products a particular bidder is qualified to deliver. Additionally, the system can adjust the list of selected bidders based on bidder performance information archived in the historical database 28 as a result of steps 124 and 128. For example, the buyer can elect to instruct the system to bypass any bidders that have been late completing their awarded contracts. The buyer has means to add to or restrict this list, based on the personal preferences of the buyer. For example, the buyer can restrict the bidders to those licensed to operate in or having a place of business in the state of Maryland. Additionally, the buyer can limit the bidders to those who have bid on or have been awarded contracts on similar projects in the past. Once the list of potential bidders is established, each such bidder is automatically notified of the list of performances by the system at step 110 and is invited to submit a bid for the list of performances. The notification can occur by email, in which each bidder is also provided with a user identification and/or password to access the particular list of performances 31 on the platform computer 21. Alternatively, the list of performances can be emailed to each selected bidder, again with an ID and/or password being provided for the bidder to access the platform computer 21 to submit a bid. In yet another embodiment of the invention, a notification of the invitation to bid can be placed in a file on the platform computer 21, which can occasionally be accessed by potential bidders across the network 202 to determine whether any invitations to bid are available. Under this embodiment, the bidder, upon viewing an invitation to bid of interest, can download the list of performances as discussed below.

The bidders who are interested in possibly accepting the invitation to bid utilize the user identification information sent to them to access the platform computer 21 and the advertised list of performances 31. The bidders can view the list of performances 31 on the graphic display of their computer 25 and can download the contents of the list of performances 31 onto their own computers 25 (arrows 37 in FIG. 3) by means of a secured data connection across the network 202. Each bidder receives on the monitor of his/her computer 25 a representation of a mask 39 in which the complete list of individual performances of the list of performances 31 are listed, with a space 41 on the right side of each performance description for entering a bid price. Total prices are constantly calculated and displayed on the bidder's monitor, broken down by subtitle, title, and work. Also available for display to the bidder are introductory remarks, contract conditions, guidelines, specifications, and/or a sample contract, as shown in the descriptions database structure of FIG. 4b. Utilizing the description and instruction information provided across the platform, the bidder enters his/her bid prices in the mask, correlating each price with each respective performance item the bidder is interested in fulfilling. The bidder has the option of storing the mask 39 and a partially completed bid response on the bidder's computer 25 until the bidder has enough time and information with which to complete the bid and transmit it to the platform computer 21.

Upon completing the pricing entries into the mask, the bidder submits at step 112 the completed bid 44 to the system on the platform computer 21 across the network 202 (arrows 43 in FIG. 3). The bid is received by the system and checked for completeness and compliance with bid submission rules, including whether a bid price was entered by the bidder for each performance description and whether all required contract fields have been entered with valid information. If entries are missing for required performance descriptions or if invalid information has been entered, the system draws the bidders' attention to this, for example, by transmitting a corresponding message to the bidder's computer 25; transmitting the bid information 44 back to the bidder, characterizing the problematic items in color; or by overlaying a respective informational reference in a "pop-up" window on the bidder's computer 25. This bid validation step helps facilitate the ultimate evaluation of the bid by the system or the buyer by ensuring that the received bid complies with the invitation to bid. The bidder can then check the bid once more and complete it, if he omitted pricing an item inadvertently; or he can consciously avoid the respective item, if he does not want to effect the particular performance. After renewed confirmation of completeness of the bid by the bidder, the content of the bid is forwarded to the platform computer 21 (arrows 43 in FIG. 3). In one embodiment of the invention, the bid validation process can take place on the bidder's computer 25 with rules and requirements provided from the platform computer 21, pursuant to requirements imposed by the buyer who submitted the invitation to bid. Such an embodiment reduces network traffic across the network 202, with only a validated bid being forwarded to the platform computer 21. The forwarded bid 44 can consist of only fielded prices responding to the bid or can include the entire contents of the invitation to bid, including the performance descriptions as well as the price entries. Alternatively, a mask can be displayed on the bidder's screen which is directly administered by the platform computer 21 by respective control sequences, so that entries or changes are transmitted to the platform computer 21 directly by the bidder, and the software on the platform computer 21 is restricted from changing any part of the bid, with the bid entries being "frozen."

The platform computer 21 receives and accepts bids from the bidders at step 114 until a predetermined submission deadline, and the system limits each bidder to submitting a single bid. Alternatively, the system will permit a bidder to submit multiple bids, with the latest bid being considered as the only valid bid. After the submission deadline has passed, the information contained in the bids 44 received by the platform computer 21 is sorted and reformatted, and the buyer is notified by email that the submitted bids are available for viewing and evaluating. Prior to the submission deadline, the buyer cannot access the contents of the bids 44 received by the platform computer 21 to obtain advance information. The purpose of this restriction is to avoid price fixing and irregularities in the bidding method. Alternately, a secured file on the platform computer 21 can be initialized with a notice that the results of an invitation to bid have been received and are available for viewing. In this embodiment, a buyer can periodically view the notice file on the platform computer 21 through a restricted access to determine whether a completed response to one of the buyer's invitations to bid has been received.

Upon accessing the platform computer 21, the buyer triggers the transmission of the bids 44 across the network 200 (arrow 45 in FIG. 3) from the platform computer 21 to the buyer's computer 23. The reformatting of the collected bid information 44 is done to present the bid information to the buyer in a clear and structured representation, so that it is simple to compare the bids. Such a tabulated representation 47 is shown in FIG. 6. The left two columns of the table contain an identification and description of the individual items or performances which are arranged in the hierarchical structure of the descriptions database 27 under the subtitle, title, or work, respectively. For each row, these two columns contain a unique number of the respective performance in the descriptions database 27 and a brief text of a more comprehensive performance description. In columns 7, 8, and 9 the bid prices of the individual bidders are shown for each line item. If more than three bids are received, additional columns can hold the other bid prices. The bid prices are assigned to the items line by line. For those lines in which a subtitle is stated, the total price resulting from the individual items of the subtitle (listed below the subtitle row) is stated in the bid price columns. Similarly, for those lines in which a title is stated, the total price of the individual subtitles of the title is stated in the bid price columns. Finally, for those lines in which a work is stated, a total price of the individual titles of the work is stated in the bid price columns. Entries which reflect the lowest and the highest bid price are marked in color; for example, green for the lowest bid price and red for the highest bid price.

In the sixth column, an average price across the submitted bids or calculated total prices is listed line by line. In the fifth column an "ideal price" is listed and represents the best price as calculated from the lowest bid prices quoted by the respective bidders within an item, a subtitle, a title, and a work. To facilitate easy comparison of each bid with the average value and the ideal price, the order of the fifth, sixth, and further columns in the listing can be freely selected by the buyer. Thus, each bid can be positioned next to the ideal price or the average price and can be directly compared with this value or another bid. This free selection of the order of columns facilitates a particularly simple analysis of the bids. An additional window of information is automatically calculated by the system and made available to the buyer to aid in the bid evaluation process. This information is shown in FIG. 7 and specifically shows to the bidder the percentage deviation between the ideal price and each bidders item, subtitle, title, and work price. Although not shown in FIG. 7, the displayed information can be expanded with additional pairs of columns for each bidder.

To further facilitate the bid evaluation process, either by the buyer or by the bid management system, an estimated price for each line item is provided by the system based on historical price information archived in the descriptions database 27 from past bid award events, as discussed more completely below regarding step 122. Based on this historical price information and based on the invitation to bid 31 generated by the buyer, the system calculates and transmits to the buyers (arrow 57 in FIG. 3) an estimated price corresponding to the generated list of performances selected by the buyer. The buyer receives the information in a mask of the user interface 59 which has a similar design as the mask in which the bidder enters his bid prices. However, in this case, the system fills in the estimated price in the respective price fields, so that the buyer can read the calculated price estimate assigned to each performance. Further, the respective price amounts are indicated on the subtitle level, the title level, and the work level. The buyer is thus provided an objective price basis against which each bid price can be compared to assist with the bid evaluation and award decision if the buyer and not the system is selecting the bid to be awarded.

In addition to price evaluation, the system and the buyer can evaluate each bid based on performance information for each bidder as archived and maintained in the historical database 28 and as discussed below in conjunction with steps 124 and 126. The buyer has the option of accessing this information for each bidder of interest, or, alternately, the system can evaluate the bidder historical information in the historical database and flag on the bid detail listing 47 those bidders that have negative information that the buyer may want to review. The flag notification can be in the form of the bidder's name in columns 7, 8, or 9 appearing in red, for example. Additionally, relevant bidder history information available to both the system and the buyer for the evaluation of bidders includes the results of past evaluations of the bidders while performing awarded contracts, the number of times the bidders have been awarded contracts, and past financial news and information regarding the bidders. The list of bidders submitting bids can be compared with the list of bidders to whom the invitations to bid were submitted, and "good" bidders as determined by the existence of positive performance information in the historical database 28 can be automatically contacted by the system to encourage them to submit bids in response to the invitation to bid.

After the evaluation of the bids, the system decides on the most favorable bid based on any combination of lowest price, estimated price, ideal price, deviation from the ideal price, and bidder performance information so as to produce the lowest price for the list of performances to be performed by a bidder with positive history information. Alternately, the bid management system can highlight a recommended bid based on criteria optionally selected by the buyer, such as lowest price, shortest delivery time, and/or positive bidder historical information. Under this feature the system supplements the evaluation process by communicating a recommendation regarding the choice of bid and/or bidder. For this purpose, the system determines the bid that represents the most favorable price in view of the total costs of the list of performances in view of any negative bidder information archived in the historical database 28 and in view of selection criteria provided by the buyer. The system permits the weighting of evaluation criteria such that, for example, bidder history information can carry more weight in the bid selection process than deviation from an ideal price. The buyer can accept this suggestion by simple acknowledgment by, for example, clicking a mouse on the highlighted bidder name or line item, whereupon the system automatically initiates the next step 118 or 120. Alternatively, the buyer can elect to completely by pass the system evaluation and manually determine the desired bid and bidder, based on pricing and performance information presented by the bid management system.

Prior to the awarding of the contract, the system is also designed to conduct additional negotiations among the bidders at step 118. For this purpose, the buyer or the system either chooses all bid prices submitted from several bidders or selectively chooses a plurality of bid item prices from several bidders in view of bidders who seem suitable for additional negotiations, based on information submitted with the bid or information gleaned from the descriptions database 27. The system initiates an e-mail to each of these chosen bidders requesting they revise their respective bids, essentially restarting the bid process at step 110 with a subset of the original prospective bidders. For this revision, a new submission deadline is determined, at the end of which the platform computer 21 gathers the bids received and again forwards them to the buyer, as described above (arrow 45 in FIG. 3).

If the buyer, rather than the bid management system, has made the bid award decision, he/she then transmits the award decision to the platform computer 21 at step 120 (arrow 49 in FIG. 3), upon which event the system initiates communication across the network 202 informing the selected bidder that he/she has been awarded the contract. This information is distributed automatically; for example, by e-mail or by initializing a notice file on the platform computer 21 accessible by the bidder across the network 202. Further, the platform computer 21 generates a contract list of performances 51 from the list of performances 31 on which the invitation for bids was based and from the prices which the selected bidder stated in his bid 44. The contract list of performances 51 is also transmitted to the bidder as a contract (arrow 53 in FIG. 3) by email or by loading the contract into a file on the platform computer 21 accessible by the bidder. If a handwritten signature is required, the system can generate a contract on paper through the output device 212, or the bidder can print the contract on the output device 214. The buyer can also attest to the contract by providing a digital signature to the document. A corresponding signed or unsigned copy of the contract is transmitted to the buyer across the network 200 for storage and/or display on the buyer's computer 23 and for printing on the output device 210.

As soon as the contract has been awarded, the system carries out a step which is important for the continued successful operation of the bid generation and evaluation process. The present inventive system is predicated in part on the belief that the awarded bid prices, as being the successful prices from the many prices submitted by the bidders, are valuable as information for fulfilling realistic price estimation in future bid evaluations. Thus, at step 122 the prices of the bid awarded in the contract are used to update the corresponding price descriptions in the descriptions database 27 (arrow 55 in FIG. 3). For this purpose, the individual prices are first divided by a regional factor, in order to make the price stored in the archive 27 independent of any geographic region. Then, the price is further divided by a price index factor, such as the Consumer Price Index, which standardizes the price in view of a reference date. Then, this adjusted price is included in the price description of the corresponding performance together with the date of the contract, in order to update the history of the price description of the descriptions database 27. The average value, the maximum value, and the minimum value are then recalculated in the price description of the descriptions database 27.

The bid evaluation process of step 114 is supplemented by a bidder evaluation method in which the quality of the past performances effected by the chosen bidder is considered. The historical information required for this evaluation is acquired during the step of monitoring the performance of a bidder under an awarded contract (step 124). The system provides a window to the buyer for the entry of this information via input device 204 during the time of performance, with all entered information automatically being archived onto the historical database 28 by bidder for subsequence use. Additionally, at the completion of a contract, a comments window is made available to the buyer at step 126 for entry of comments regarding the overall performance of the bidder under the contract. These comments are also automatically added to the information archived in the historical database 28 so that bidder performance information can be taken into consideration in the evaluation of the bids at step 114. This information can be maintained in the historical database 28 as simple, factual information relating positive and negative experiences with bidders. Alternatively, the system can evaluate the archived comments, searching for key words and phrases such as "on time", "late", "over budget", and "quality" to rank the bidders based on the quality of their past performances.

At step 128, the lists of performances comprising the invitation for bids for the completed contract are stored in the descriptions database 27, so that any new performance descriptions drafted by the buyer are incorporated in the database 27, thereby saving future buyers the trouble of writing new performance descriptions.

Alternatively, or supplementally, the system can also be designed to conduct an auction. After receipt of the bids (arrow 45 in FIG. 3), the system or the buyer can select a number of bidders who appear suitable for conducting an auction. One criteria for conducting an auction is when the bid prices are relatively close in amount. Another criteria is when several bidders have submitted bids and the bid prices are below the estimated prices for the list of performances, either by item, subtitle, title, or work. The system communicates with the selected bidders, such as by email, and invites them to participate in the auction. In the scope of the auction, each participating bidder is given access to a mask made available by the system, which mask is designed in a similar way as the mask in FIG. 6 and includes the bid prices from the other bidders. However, the auction mask is anonymous to the extent that the bidders cannot determine the names of the other bidders. Then, each bidder is provided the ability to change the prices in a column assigned to him, with the prices typically being lowered by the bidder. These changes are directly transmitted to the platform computer 21, where the system updates the provided mask, so that these changes become visible also to the other bidders. The other bidders are then in a position to react to these changes and to also lower their bids. In the mask provided for the auction, a column comprising synthetic prices may be included, the synthetic prices serving the purpose of motivating the selected bidders to bid lower prices. The synthetic prices are calculated by the system as a function of prior pricing, such as the previously discussed prices estimated from past accepted bids. Alternatively, the synthetic prices can be computed from the ideal prices calculated by the inventive system as discussed above regarding FIGS. 6 and 7. In this embodiment of the system, the synthetic/ideal price is recalculated following each bidders resubmission of bid prices and retransmitted/redisplayed to the auction bidders. The end of the auction is predetermined either by the system or the buyer, until which time each bidder can change his/her bid. Conditions for terminating the auction include elapsed time, bid activity level, and achieving a minimum bid price.

In one embodiment of the invention, a third party (hereinafter "manager") manages the operation of the platform computer 21 and its related resources and data, with the buyers and the bidders accessing the bid management system platform across the networks 200 and 202, respectfully. The manager provides to the buyers through the descriptions database 27 standardized performance descriptions, and the buyers select from the performance descriptions those which he/she would like to have included in the list of performances being generated. In the case of a contract award in the bidding procedure, the manager of the bidding procedure then learns of the prices of the individual performances of the contract list of performances and thus gains experience in view of realistic prices proven in practice which can be assigned to the individual standardized performances. Since the bidder of the bidding procedure usually has a plurality of customers, i.e. Contract awarders or the parties inviting for bids, who use the bidding procedure, the manager gains a greater wealth of experience in view of the actual bid performance prices than one single contract awarder could ever achieve. The manager providing the bidding procedure passes this experience to each customer by placing at the buyers' disposal a price estimate for a list of performances generated for a specific invitation for bids, based on actual past bid awards. Thereby, the customers enjoy the advantages of working with a particularly precise price estimate, in order to thereby maintain a predetermined cost frame comparatively precisely.

The previously described bidding method is carried out using a system whose central component is the network platform computer 21, through which the key descriptions and historical databases are maintained, the platform computer 21 being made available by a suitable web server. On the one hand, this web server can be accessed by buyers which each operate a web client for this purpose, with suitable software.

In a similar way, the bidders with their web clients can access the server, the bidders operating software applications either permanently or online. In this context, while the preferred embodiment uses the Internet as communications medium, any other communications media can be used with the present bid management system without detracting from its inventive features.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A system for conducting invitations for bids for at least one contract awarder, wherein the bidding method is carried out for at least one performance to be effected by a bidder, comprising:
   a data storage device storing at least performance descriptions and price descriptions, wherein assigned to a plurality of predetermined performances there is stored at least one performance description and one price description for effecting the performance;
   a communications device forwarding performance descriptions selected from the stored performance descriptions to a party submitting an invitation for bids;
   a first receiving device receiving a list of performances, from the party submitting an invitation for bids, generated from the forwarded performance descriptions;
   a first transmission device forwarding the list of performances to a plurality of bidders;
   a second receiving device receiving bids from at least one bidder of the plurality of bidders, each bid comprising at least one bid price input to a bid mask by the bidder, which bid price is assigned to a performance description of the forwarded list of performances, which bid price states the amount to be paid to the bidder for effecting the respective performance by the bidder;
   a second transmission device transmitting the received bids to the party submitting the invitation for bids;
   a third receiving device receiving information regarding a bid selected by the party submitting the invitation for bids; and
   an update device updating the price descriptions stored in the data storage device based on at least one bid price of the bid selected by the party submitting the invitation for bids.

2. A computer system for carrying out an invitation for bids for at least one performance to be effected by a bidder, comprising:
   a first transmission device transmitting a request to a remote server for transmitting a plurality of performance descriptions assigned to predetermined performances;
   a first receiving device receiving the transmitted plurality of performance descriptions;
   a selection device selecting at least one performance description from the plurality of received performance descriptions;
   a second transmission device transmitting information regarding the selected performance descriptions to the remote server;
   a second receiving device receiving prices, from a plurality of bidders, each price having been input into a bid mask by a bidder from the plurality of bidders and assigned to the selected performance descriptions;

a processor determining one of the bidders as a selected bidder; and a third transmission device transmitting to the remote server information designating the selected bidder.

3. The computer system according to claim 2, further comprising an indication device, said indication device generating a mask which shows in a column line by line, one below the other, data characterizing the selected performance descriptions, and which in a plurality of further columns shows the prices received from the plurality of bidders such that each bidder is assigned a separate column and the prices assigned to the same performance descriptions are arranged in the same line.

4. The computer system according to claim 3, further comprising an input device inputting a request for modification of the assignment of the bidders to the plurality of further columns.

5. A system for managing an invitation for bids for at least one performance to be effected by a bidder, comprising:

a storage device archiving a plurality of performances in a descriptions database, wherein each archived performance includes a performance description;

a first processor generating a list of desired performances from the archived performances;

a transmission device distributing the generated list of performances to a plurality of bidders;

a receiving device receiving a bid submitted from at least one of the plurality of bidders, wherein each submitted bid includes a price input into a bid mask by the at least one bidder of the plurality of bidders and assigned to at least one of the distributed list of performances and wherein the assigned price is the bid price to be paid to the bidder for effecting the respective performance by the bidder;

a second processor evaluating the received bids and automatically selecting a bid from the bids received; and an update device updating the archived descriptions database with the prices from the selected bid.

* * * * *